(12) United States Patent
Matsumoto

(10) Patent No.: US 12,246,544 B2
(45) Date of Patent: Mar. 11, 2025

(54) PRINTING TAPE WITH IMPROVED RESISTANCE TO TEMPERATURE AND WATER

(71) Applicant: BROTHER KOGYO KABUSHIKI KAISHA, Nagoya (JP)

(72) Inventor: Haruki Matsumoto, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/139,564

(22) Filed: Sep. 24, 2018

(65) Prior Publication Data

US 2019/0061375 A1 Feb. 28, 2019

Related U.S. Application Data

(63) Continuation of application No. PCT/JP2017/011743, filed on Mar. 23, 2017.

(30) Foreign Application Priority Data

Mar. 29, 2016 (JP) .................................. 2016-065633

(51) Int. Cl.
*B41J 3/36* (2006.01)
*B41J 15/04* (2006.01)
(Continued)

(52) U.S. Cl.
CPC .............. *B41J 3/36* (2013.01); *B41J 15/044* (2013.01); *B41J 17/32* (2013.01); *B41J 33/003* (2013.01);
(Continued)

(58) Field of Classification Search
None
See application file for complete search history.

(56) References Cited

U.S. PATENT DOCUMENTS 5,100,711 A * 3/1992 Satake ..................... B41M 5/30
346/135.1
5,474,968 A * 12/1995 Norimatsu ............... B41J 32/00
360/132
(Continued)

FOREIGN PATENT DOCUMENTS

CN 101850665 A 10/2010
EP 0748700 A1 * 5/1996
(Continued)

OTHER PUBLICATIONS

JPH06-328850 English Machine Translation (Year: 1994).*
(Continued)

*Primary Examiner* — Patricia L. Nordmeyer
(74) *Attorney, Agent, or Firm* — Scully, Scott, Murphy & Presser, PC

(57) ABSTRACT

An elongated printing tape includes a heat-sensitive layer, a first protective layer, a second protective layer, and a first adhesive layer. The heat-sensitive layer produce color at temperatures within a prescribed range. The first protective layer is provided on the heat-sensitive layer. The second protective layer is provided on the side of the heat-sensitive layer opposite the first protective layer. The second protective layer contains at least one resin selected from a group consisting of fluorine-based resins, silicone-based resins, olefin-based resins, polyester-based resins, epoxy/polyester-based resins, and silicon-based resins. The first adhesive layer is provided on the side of the second protective layer opposite the heat-sensitive layer. The first adhesive layer contains at least one adhesive selected from a group consisting of (a) emulsion-type adhesive compounded with tackifying resin and containing acrylic polymer and rubber-based adhesive, (b) silicone-based adhesive, and (c) rubber-based adhesive.

11 Claims, 10 Drawing Sheets

(51) Int. Cl.

| | | |
|---|---|---|
| *B41J 17/32* | (2006.01) | |
| *B41J 33/00* | (2006.01) | |
| *B41M 5/41* | (2006.01) | |
| *B41M 5/42* | (2006.01) | |
| *B41M 5/44* | (2006.01) | |
| *C09J 121/00* | (2006.01) | |
| *C09J 133/00* | (2006.01) | |
| *C09J 183/04* | (2006.01) | |

(52) U.S. Cl.
CPC ............... *B41M 5/41* (2013.01); *B41M 5/42* (2013.01); *B41M 5/44* (2013.01); *C09J 121/00* (2013.01); *C09J 133/00* (2013.01); *C09J 183/04* (2013.01)

(56) References Cited

U.S. PATENT DOCUMENTS

| | | | | |
|---|---|---|---|---|
| 6,479,431 | B1 * | 11/2002 | McFall | C10M 141/10 503/200 |
| 2002/0155372 | A1 * | 10/2002 | Liang | B41M 5/287 430/293 |
| 2010/0247205 | A1 | 9/2010 | Yamaguchi et al. | |
| 2010/0254742 | A1 | 10/2010 | Yamaguchi et al. | |
| 2012/0080550 | A1 | 4/2012 | Yamaguchi et al. | |

FOREIGN PATENT DOCUMENTS

| | | | |
|---|---|---|---|
| JP | H06-127062 | A | 5/1994 |
| JP | H06-127090 | A | 5/1994 |
| JP | H06-127092 | A | 5/1994 |
| JP | 06286310 | A * | 10/1994 |
| JP | H06-328850 | A | 11/1994 |
| JP | H08-34163 | A | 2/1996 |
| JP | H09-164637 | A | 6/1997 |
| JP | 2975458 | B2 | 11/1999 |
| JP | 2011-011405 | A | 1/2011 |

OTHER PUBLICATIONS

JPH08-34163 English Machine Translation (Year: 1996).*
JPH06-286310 English Machine Translation.*
Chinese Office Action dated Jan. 15, 2020 in Chinese Patent Application No. 201780020509.4.
International Search Report dated May 16, 2017 issued in PCT/JP2017/011743.
Extended Supplementary European Search Report dated Jan. 3, 2020 in European Patent Application No. 17 77 4668.2.
Translation of the International Preliminary Report on Patentability dated Oct. 11, 2018 issued in PCT/JP2017/011743.
European Communication dated May 6, 2022 received in European Application No. 17 774 668.2.

* cited by examiner

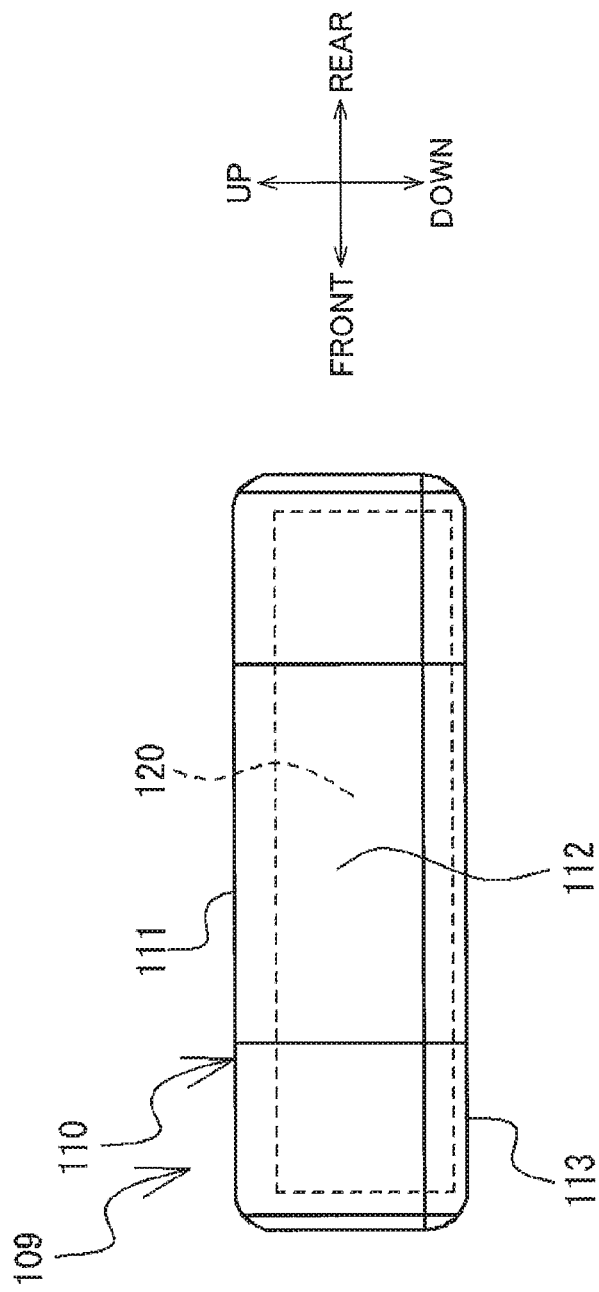

FIG. 10

| | COMPARATIVE EXAMPLE | EXAMPLE OF THE EMBODIMENT |
|---|---|---|
| FIRST ADHESIVE LAYER | ACRYLIC-BASED ADHESIVE (SOLVENT) | |
| SECOND PROTECTIVE LAYER | POLYVINYL ALCOHOL THICKNESS OF APPROX. 1 μm | POLYTETRAFLUOROETHYLENE RESIN (TETRAFLUORIDE) THICKNESS OF APPROX. 1 μm |
| HEAT-SENSITIVE LAYER | LEUCODYE, DEVELOPER, AUXILIARY AGENTS (FILLERS, BINDERS, LUBRICANTS, ANTIOXIDANTS, WATER-RESISTANT ADDITIVES, FILM-FORMING ASSISTANTS, PIGMENTS, STABILIZERS, DISPERSANTS, ANTIFOAMING AGENTS, etc.) | |
| FIRST PROTECTIVE LAYER | PET AT A THICKNESS OF 25 μm | |
| BEFORE TESTING | ABC | ABC |
| AFTER TESTING | (faded/smudged) | ABC |

PRINTING TAPE WITH IMPROVED RESISTANCE TO TEMPERATURE AND WATER

CROSS REFERENCE TO RELATED APPLICATION

This application is a by-pass continuation application of International Application No. PCT/JP2017/011743 filed Mar. 23, 2017 in the Japan Patent Office acting as Receiving Office and claiming priorities from Japanese Patent Application No. 2016-065633 filed Mar. 29, 2016. The entire contents of the International application and the Japanese Patent application are incorporated herein by reference.

TECHNICAL FIELD

The present disclosure relates to a printing tape and a printing tape cassette housing the printing tape.

BACKGROUND

There is conventionally known various printing devices proposed for printing characters and the like on a long continuous strip of printing tape as described in Japanese Unexamined Patent Application Publication No. 1994-127092. The printing tape described in the Japanese Unexamined Patent Application Publication has a heat-sensitive layer, and an overcoat layer. The heat-sensitive layer is formed on the surface of the printing tape on which characters and the like are to be printed and can produce color when exposed to heat from heating elements in a thermal head. The overcoat layer is provided when the heat-sensitive layer must be protected from an adhesive. Examples of compounds that are used to form the overcoat layer include polyvinyl alcohol, methyl cellulose, ethyl cellulose, carboxymethyl cellulose, polyvinyl pyrrolidone, polyacrylamide, starch, gelatin, and methoxycellulose.

SUMMARY

However, the printing tape disclosed in the Japanese Unexamined Patent Application Publication has insufficient resistance to temperature and water (humidity) for protecting the heat-sensitive layer from adhesives, and characters and the like printed on this printing tape often become faint due to the effects of temperature, humidity, and the like.

In view of the foregoing, it is an object of the present invention to provide a printing tape with better resistance to temperature and water (humidity) than conventional printing tape. It is another object of the present invention to provide a printing tape cassette housing this printing tape.

In order to attain the above and other objects, according to one aspect, the disclosure provides an elongated printing tape including a heat-sensitive layer, a first protective layer, a second protective layer, and a first adhesive layer. The heat-sensitive layer produce color at temperatures within a prescribed range. The first protective layer is provided on the heat-sensitive layer. Light is allowed to transmit through the first protective layer. The second protective layer is provided on the side of the heat-sensitive layer opposite the first protective layer. The second protective layer contains at least one resin selected from a group consisting of fluorine-based resins, silicone-based resins, olefin-based resins, polyester-based resins, epoxy/polyester-based resins, and silicon-based resins. The first adhesive layer is provided on the side of the second protective layer opposite the heat-sensitive layer. The first adhesive layer contains at least one adhesive selected from a group consisting of (a) emulsion-type adhesive compounded with tackifying resin and containing acrylic polymer and rubber-based adhesive, (b) silicone-based adhesive, and (c) rubber-based adhesive.

According to another aspect, the disclosure provides a printing tape cassette including a cassette case, a first tape, and a second tape. The cassette case has a first surface, a second surface facing the first surface, and a third surface connecting the first surface and the second surface. The combination of the first surface, the second surface and the third surface define an internal space. The cassette case is attached to a cassette housing section of a printing device. The first tape is accommodated in the internal space and wound in a roll. The first tape includes a heat-sensitive layer, a first protective layer, and a second protective layer. The heat-sensitive layer produce color at temperatures within a prescribed range. The first protective layer is provided on the heat-sensitive layer. Light is allowed to transmit through the first protective layer. The second protective layer is provided on the side of the heat-sensitive layer opposite the first protective layer. The second protective layer contains at least one resin selected from a group consisting of fluorine-based resins, silicone-based resins, olefin-based resins, polyester-based resins, epoxy polyester-based resins, and silicon-based resins. The second tape is accommodated in the internal space and wound in a roll. The second tape includes a first adhesive layer, and a base material. The first adhesive layer contains at least one adhesive selected from a group consisting of emulsion-type adhesive compounded with tackifying resin and containing acrylic polymer and rubber-based adhesive, silicone-based adhesive, and rubber-based adhesive. The first adhesive layer is adhered to the second protective layer. The base material adhered to the side of the adhesive layer opposite a surface of the first adhesive layer adhered to the second protective layer.

BRIEF DESCRIPTION OF THE DRAWINGS

The particular features and advantages of the embodiments will become apparent from the following description taken in connection with the accompanying drawings, in which:

FIG. 8 is a right-side view of a printing tape cassette;

FIG. 10 is a table showing conditions and results of tests for evaluation.

DETAILED DESCRIPTION

Next, embodiments of the present invention will be described while referring to the accompanying drawings. The referenced drawings are used to describe the technical features made possible with the present invention. The configurations of the apparatuses described below are merely examples, and the present invention is not intended to be limited to these configurations.

Figure 1:
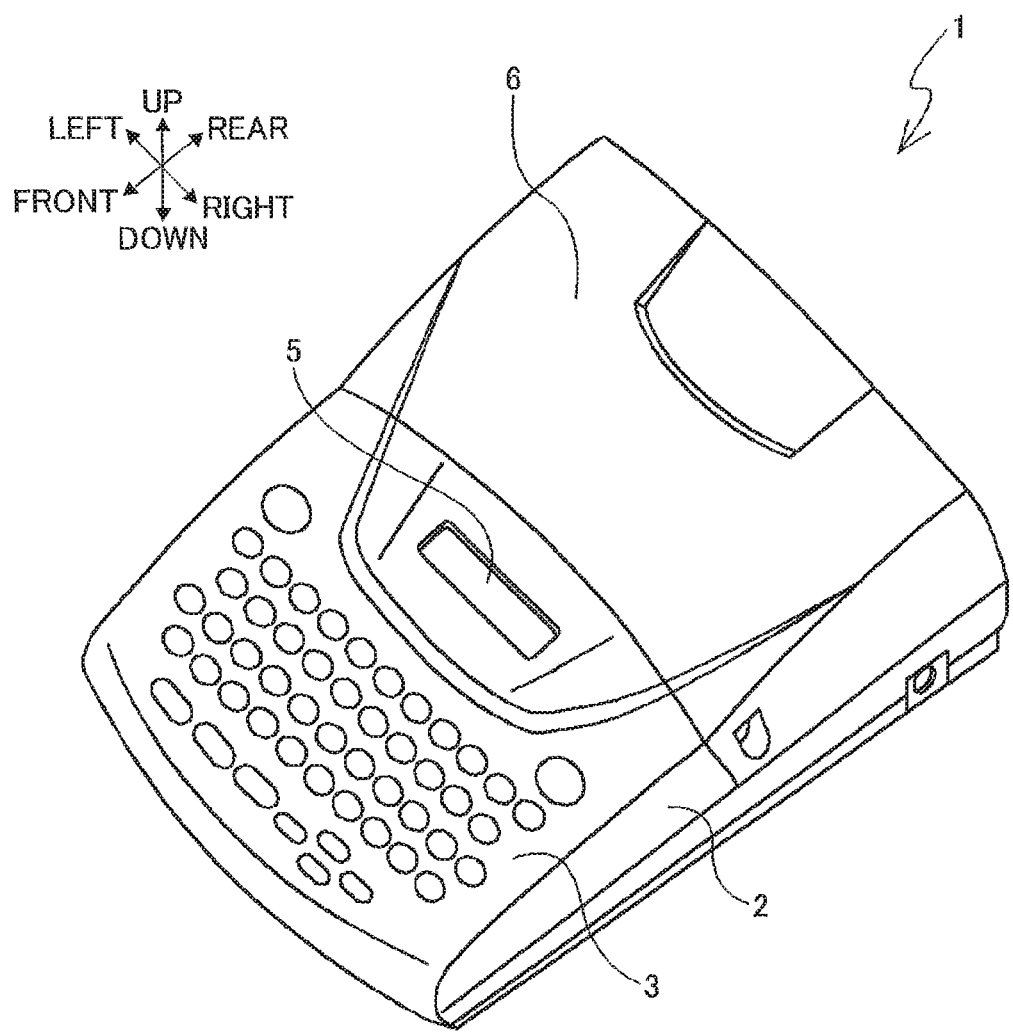
FIG. 1 is a perspective view of a printing device when a cassette cover is in a closed state.
Figure 2:
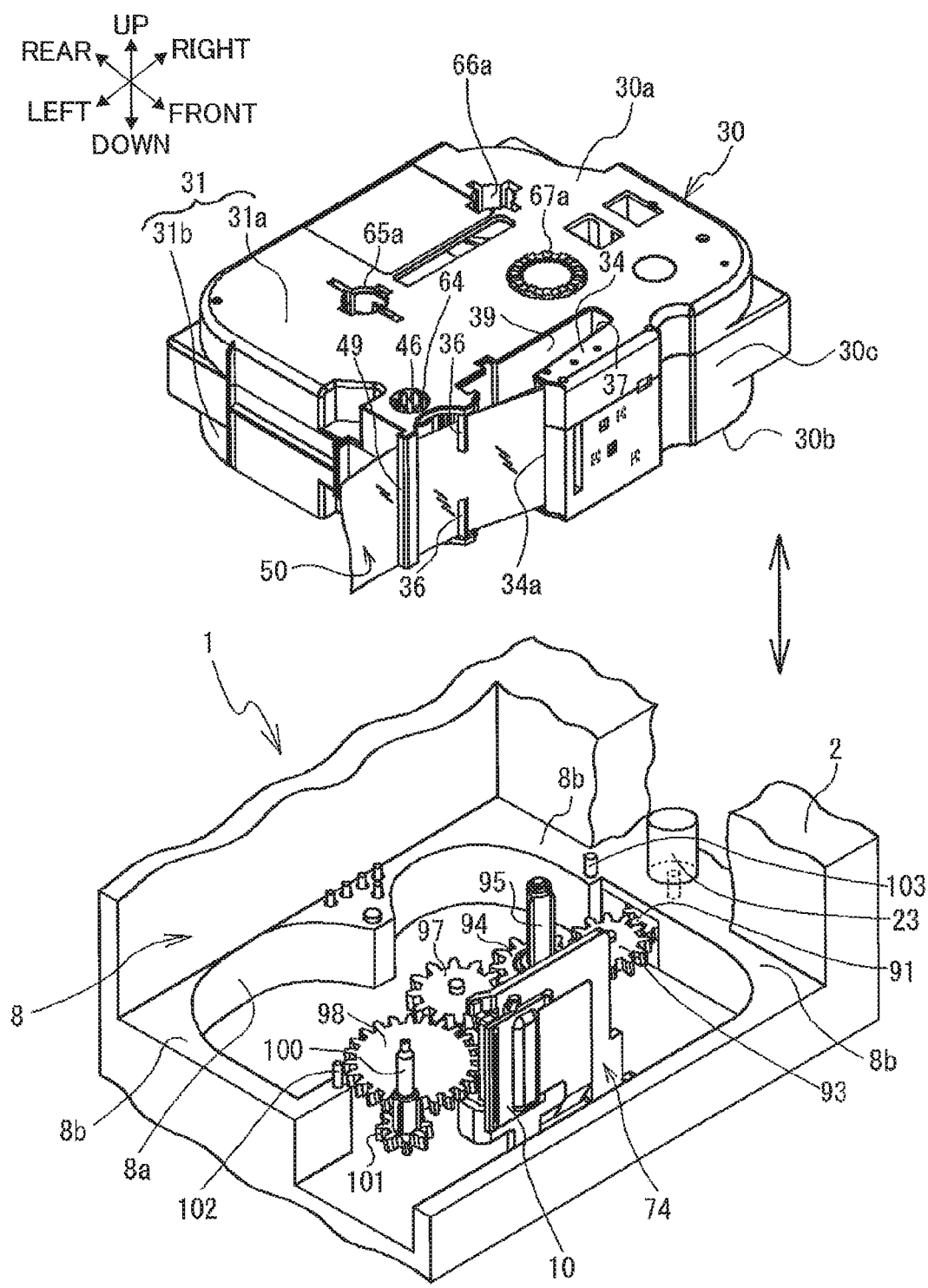
FIG. 2 is a perspective view for explaining a printing tape cassette and a cassette housing section.
Figure 3:
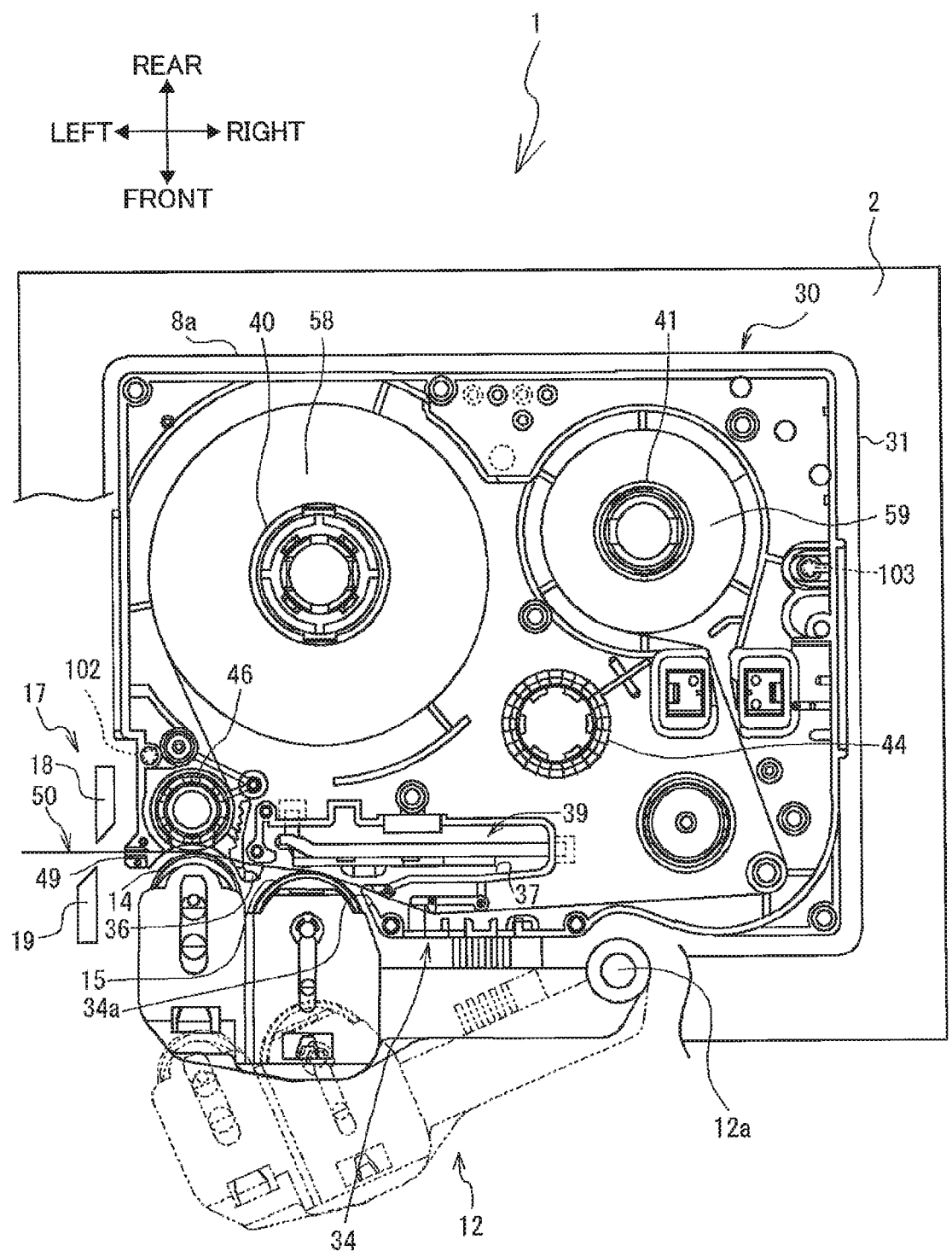
FIG. 3 is a plan view of a cassette housing section when the printing tape cassette 30 is attached to the cassette housing section.

First, a printing tape cassette 30 and a printing device 1 in which the printing tape cassette 30 is mounted will be described with reference to FIGS. 1 through 5 according to a first embodiment of the invention. In the following description of the embodiment, the lower-left side, upper-right side, lower-right side, and upper-left side of the printing device 1 in FIG. 1 are respectively defined as the front side, rear side, right side, and left side of the printing device 1. The lower-right side, upper-left side, upper-right side, and lower-left side of the printing tape cassette 30 in FIG. 2 are respectively defined as the front side, rear side, right side, and left side of the printing tape cassette 30. A group of gears shown in FIG. 2 that include gears 91, 93, 94, 97, 98, and 101 is actually covered and hidden by the bottom surface of a cavity 8a. However, the bottom surface of the cavity 8a is not shown in FIG. 2 for the purpose of describing this group of gears. FIG. 2 also schematically depicts side walls that form a periphery around a cassette housing section 8, but this is merely a schematic diagram and the side walls are drawn thicker than the thickness of the actual side walls. Further, to facilitate understanding, the printing tape cassette 30 mounted in the cassette housing section 8 in FIG. 3 is depicted without an upper case 31a.

Structure of a Printing Device 1 According to a First Embodiment

The structure of a printing device 1 in which a printing tape cassette 30 is mounted will be described with reference to FIG. 1. As shown in FIG. 1, the printing device 1 is a general-purpose tape printing device in which various types of printing tape cassettes can be commonly used, including a thermal type, a receptor type, and a laminated type. The printing device 1 is provided with a main unit cover 2, a keyboard 3, a display 5, and a cassette cover 6. The main unit cover 2 has a rectangular parallelepiped shape in a plan view. The keyboard 3 is arranged on the front side of the main unit cover 2. The keyboard 3 includes character keys for alphabetic and numeric characters and symbols, and various function keys. The display 5 is provided on the rear side of the keyboard 3. The display 5 can display inputted alphanumeric characters and symbols. The cassette cover 6 is provided on the rear side of the display 5. The cassette cover 6 is opened and closed when replacing the printing tape cassette 30. While not shown in the drawings, a discharge slit is provided toward the rear on the left side of the main unit cover 2. Tape that has been printed is discharged from the main unit cover 2 through this discharge slit. A discharge window is also formed on the left side surface of the cassette cover 6. The discharge slit is exposed on the outside of the main unit cover 2 through the discharge window when the cassette cover 6 is in a closed state.

The internal structure of the main unit cover 2 under the cassette cover 6 will be described next with reference to FIG. 2. As shown in FIG. 2, a cassette housing section 8 is provided inside the main unit cover 2 in a region corresponding to the cassette cover 6. Thus, when the cassette cover 6 is open, the printing tape cassette 30 can be freely inserted into and removed from the cassette housing section 8. The cassette housing section 8 includes a cavity 8a, and a cassette support part 8b. The cavity 8a is formed as a depression that substantially corresponds to the shape of a bottom surface 30b of a cassette case 31 described later and has a flat bottom surface. The cassette support part 8b is a flat surface that extends horizontally from the outer edges of the cavity 8a. The cassette support part 8b has a rectangular shape elongated in the left-right direction in a plan view and corresponds substantially to the shape of the printing tape cassette 30 in a plan view. In a plan view, the rear edge of the cavity 8a has two arcs formed adjacent to each other in the left-right direction.

As shown in FIG. 2, two positioning pins 102 and 103 are provided at two locations on the cassette support part 8b. More specifically, the positioning pin 102 is provided on the left side of the cavity 8a and the positioning pin 103 is provided on the right side of the cavity 8a. The positioning pins 102 and 103 are disposed in positions respectively corresponding to pin holes 62 and 63 described later when the printing tape cassette 30 is mounted in the cassette housing section 8. The pin holes 62 and 63 are two recessed parts formed in the bottom surface of the printing tape cassette 30. When the printing tape cassette 30 is mounted in the cassette housing section 8, the positioning pins 102 and 103 are respectively inserted into the pin holes 62 and 63, thereby supporting the printing tape cassette 30 from below at left and right positions on the peripheral portion of the printing tape cassette 30.

The cassette housing section 8 is also provided with a conveying mechanism that conveys tape drawn out from the printing tape cassette 30, a printing mechanism that prints characters and the like on the surface of the tape, and the like. As shown in FIG. 2, a head holder 74 is fixedly disposed on the front side of the cassette housing section 8, and a thermal head 10 provided with heating elements (not shown) is mounted in the head holder 74.

A tape feed motor 23 is arranged on the outer side of the cassette housing section 8 (the upper-right side in FIG. 2). The tape feed motor 23 is configured of a stepping motor. A drive gear 91 is fixed to the lower end of a drive shaft in the tape feed motor 23. The drive gear 91 is meshed with a gear 93 through an opening penetrating the right wall of the cassette housing section 8, and the gear 93 is meshed with a gear 94. A ribbon take-up shaft 95 is disposed in an upright state on the top surface of the gear 94. The ribbon take-up shaft 95 drives a ribbon take-up spool 44 described later to rotate. A gear 97 is also meshed with the gear 94, a gear 98 is meshed with the gear 97, and a gear 101 is meshed with the gear 98. A tape drive shaft 100 is disposed in an upright state on the top surface of the gear 101. The tape drive shaft 100 drives a tape drive roller 46 described later to rotate.

When the tape feed motor 23 is driven to rotate in the counterclockwise direction while the printing tape cassette 30 is mounted in the cassette housing section 8, the ribbon take-up shaft 95 is also driven to rotate in the counterclockwise direction via the drive gear 91, gear 93, and gear 94. The rotation of the ribbon take-up shaft 95 drives the ribbon take-up spool 44 in the printing tape cassette 30 to rotate.

The ribbon take-up spool 44 is mounted over the ribbon take-up shaft 95. The rotation of the gear 94 is also transmitted to the tape drive shaft 100 via the gear 97, gear 98, and gear 101, thereby driving the tape drive shaft 100 to rotate in the clockwise direction. The rotation of the tape drive shaft 100 drives the tape drive roller 46 in the printing tape cassette 30 to rotate. The tape drive roller 46 is mounted over the tape drive shaft 100.

As shown in FIG. 3, an arm-like platen holder 12 is pivotably supported about a support shaft 12a provided on the front side of the head holder 74. A platen roller 15 and a movable feed roller 14 are both rotatably supported on the distal end of the platen holder 12. The platen roller 15 is disposed so as to be capable of contacting and separating from the thermal head 10 when the platen holder 12 pivots, while the movable feed roller 14 is disposed so as to be capable of contacting and separating from the tape drive roller 46 that is mounted over the tape drive shaft 100.

A release lever (not shown) is coupled with the platen holder 12. The release lever moves in the left-right direction in association with the opening and closing of the cassette cover 6. Specifically, when the cassette cover 6 is opened, the release lever moves rightward, and the platen holder 12 moves toward a standby position (the position depicted with dashed lines in FIG. 3). When moving toward the standby position, the platen holder 12 separates from the cassette housing section 8, allowing the printing tape cassette 30 to be inserted into or removed from the cassette housing section 8. A coil spring (not shown) constantly urges the platen holder 12 elastically toward the standby position (counterclockwise in a plan view).

When the cassette cover 6 is closed, on the other hand, the release lever moves leftward, and the platen holder 12 moves toward a printing position depicted with solid lines in FIG. 3. When moving toward the printing position, the platen holder 12 moves in a direction approaching the cassette housing section 8. When a thermal-type printing tape cassette 30 possessing a first tape 59 and a second tape 58 is mounted in the cassette housing section 8, as illustrated in FIG. 3, the platen roller 15 presses the first tape 59 against the thermal head 10 while the movable feed roller 14 presses the first tape 59 and second tape 58 against the tape drive roller 46.

As shown in FIG. 3, the printed first tape 59 and the second tape 58 become a printing tape 50 after joining at the nip point between the movable feed roller 14 and tape drive roller 46. The printing tape 50 exits the printing tape cassette 30 via a tape discharge part 49. A conveying path for conveying the printing tape 50 is provided from the tape discharge part 49 to the discharge slit (not shown) in the printing device 1. A cutting mechanism 17 is disposed on the conveying path for cutting the printing tape 50 at a prescribed position. The cutting mechanism 17 is configured of a fixed blade 18, and a movable blade 19 that opposes the fixed blade 18 and is supported to be capable of moving in the front-rear direction (vertical direction in FIG. 3). A cutter motor (not shown) is provided for moving the movable blade 19 in the front-rear direction.

2. Structure of the Printing Tape Cassette 30 According to the First Embodiment Next, the structure of the printing tape cassette 30 according to the first embodiment will be described with reference to FIGS. 2 through 4. As shown in FIG. 3, the printing tape cassette 30 has a cassette case 31, the first tape 59, and the second tape 58. As shown in FIG. 2, overall, the cassette case 31 is a substantially rectangular parallelepiped (box-shaped) housing with corners that are rounded in a plan view. The cassette case 31 is configured of a lower case 31b and an upper case 31a. The lower case 31b includes a bottom surface 30b of the cassette case 31. The upper case 31a includes a top surface 30a of the cassette case 31 and is fixed to the top of the lower case 31b. When the upper case 31a and lower case 31b are fixed together, a side surface 30c of a prescribed height is formed along the outer edges of the top surface 30a and bottom surface 30b. In other words, the cassette case 31 is a box-like casing that includes the top surface 30a and bottom surface 30b constituting a pair of rectangular-shaped planar surfaces oppositely arranged in the vertical direction, and the side surface 30c formed at a prescribed height along the outer edges of the top surface 30a and bottom surface 30b (in this example, four sides surfaces including the front surface, rear surface, left side surface, and right side surface). The combination of the top surface 30a, bottom surface 30b, and the side surface 30c defines an internal space. The first tape 59 and the second tape 58 are accommodated in the internal space and wound in a roll. In the cassette case 31, the side surface 30c need not enclose the entire peripheries of the top surface 30a and bottom surface 30b. For example, an opening may be provided in a portion of the side surface 30c (the rear surface, for example) that exposes the interior of the cassette case 31, and a boss connecting the top surface 30a to the bottom surface 30b may be provided in a position confronting this opening. In the first embodiment, the vertical dimension of the cassette case 31 (i.e., the direction in which the top surface 30a and bottom surface 30b oppose each other) substantially corresponds to the direction in which the printing tape cassette 30 is inserted into and removed from the cassette housing section 8.

The front side of the cassette case 31 is provided with an arm part 34, a head insertion section 39, guide parts 36, and a tape discharge part 49. The arm part 34 extends diagonally leftward and forward from the right front portion of the printing tape cassette 30. The extended direction of the arm part 34 is substantially aligned with the longitudinal direction of the cassette case 31 (left-right direction). An opening 34a that is elongated vertically is formed in the distal end (left end) of the arm part 34. When the cassette case 31 is assembled by joining the upper case 31a and lower case 31b together, a conveying path is formed inside the arm part 34 for guiding conveyance of the first tape 59. As shown in FIG. 3, after the first tape 59 is guided along this conveying path, the first tape 59 is discharged through the opening 34a into the head insertion section 39 (and more specifically an opening 77 described later). Thus, the opening 34a is provided in the side surface 30c and constitutes the portion in the cassette case 31 through which the first tape 59 guided along the prescribed conveying path passes from the inside to the outside of the cassette case 31.

Figure 4:
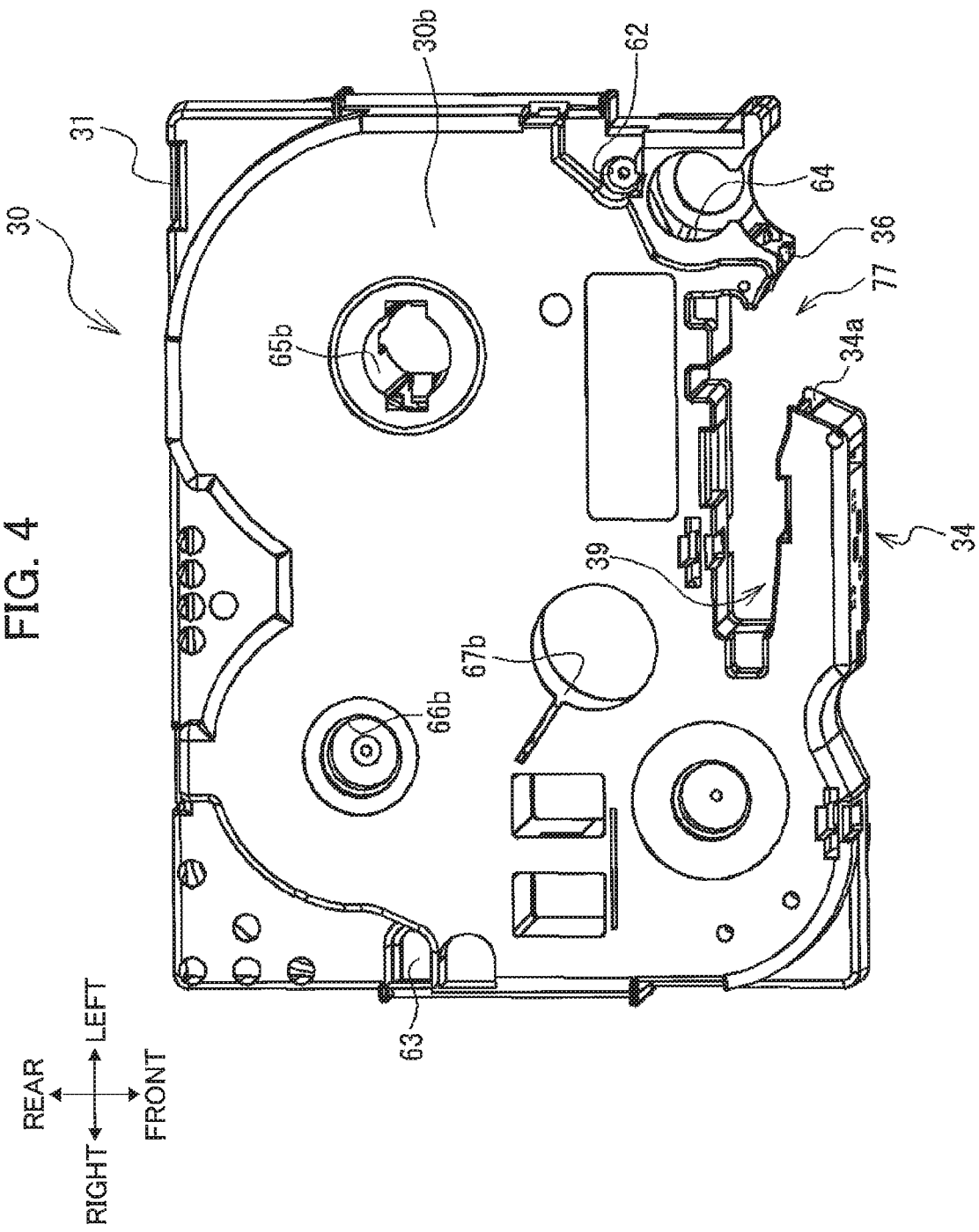
FIG. 4 is a perspective view illustrating an external appearance of the printing tape cassette in a bottom surface view.

The head insertion section 39 is a space surrounded by a rear surface 37 of the arm part 34, and a peripheral surface of the cassette case 31 formed continuously with the rear surface 37 of the arm part 34, and has a general rectangular shape in a plan view. The head insertion section 39 penetrates the printing tape cassette 30 vertically. The head insertion section 39 is provided in a forwardly biased position in the cassette case 31 (i.e., in a position biased toward the side opposite the second tape 58 and first tape 59). As shown in FIG. 4, the head insertion section 39 also communicates with the outside of the printing tape cassette 30 at the front side thereof through an opening 77 formed in the front surface of the printing tape cassette 30. The head holder 74 that supports the thermal head 10 of the printing device 1 is inserted into the head insertion section 39. The thermal head 10 prints on the first tape 59 discharged through the opening 34a of the arm part 34 in the opening 77 where the first tape 59 is exposed to the outside of the cassette case 31.

The guide parts 36 are provided on the side surface 30c upstream of the tape drive roller 46. After the first tape 59 has passed out of the cassette case 31 through the opening 34a and has been printed by the thermal head 10 in the opening 77, the guide parts 36 guide the first tape 59 back inside the cassette case 31. The guide parts 36 in this example are a pair of bar-shaped members extending vertically. The guide parts 36 guide the printed first tape 59 from the downstream side of the thermal head 10 toward the tape discharge part 49 while restricting movement of the first tape 59 vertically (in the direction along the tape width). Hence, the guide parts 36 ensure that the printed first tape 59 is properly bonded to the second tape 58 with no positional displacement therebetween.

The tape discharge part 49 is a plate-shaped member spanning between the top surface 30a and bottom surface 30b of the cassette case 31. The tape discharge part 49 is slightly separated in the forward direction from the front end on the left side surface of the cassette case 31. The tape discharge part 49 guides the printing tape 50 conveyed over the guide parts 36 and tape drive roller 46 into a passage formed between the front end on the left side surface of the lower case 31b and the side surface of the cavity 8a, and discharges the printing tape 50 through a tape discharge opening (not shown) at the downstream end of the passage.

As shown in FIG. 4, pin holes 62 and 63 are provided in the bottom surface 30b to correspond to the positioning pins 102 and 103 of the printing device 1 described above. Specifically, a recessed part provided in the left-front portion (the lower-right corner in FIG. 4) of the cassette case 31, constitutes the pin hole 62 in which the positioning pin 102 is inserted. A recessed part provided near the center region on the right edge of the cassette case 31 constitutes the pin hole 63 in which the positioning pin 103 is inserted.

Support holes 65a, 66a, and 67a (see FIG. 2) are formed in the upper case 31a, and support holes 65b, 66b, and 67b (see FIG. 4) are formed in the lower case 31b for rotatably supporting a first tape spool 40 and a second tape spool 41 described later, as well as the ribbon take-up spool 44.

As shown in FIG. 3, the first tape 59 is a long strip of tape wound in a roll about the second tape spool 41. As shown in FIG. 5, the first tape 59 is configured of a first protective layer 591, a heat-sensitive layer 592, and a second protective layer 593. The first protective layer 591 is provided on the heat-sensitive layer 592. The first protective layer 591 transmits light. The first protective layer 591 should be capable of transmitting a sufficient amount of light for observing color development in the heat-sensitive layer 592. For example, the first protective layer 591 may be formed of a resin, such as polyethylene (PE), polypropylene (PP), ethylene vinyl acetate (EVA) copolymer, ethylene methacrylic acid (EMAA) copolymer, polybutene (PB), polybutadiene (BDR), polymethylpentene (PMP), polyethylene terephthalate (PET), polyethylene naphthalate (PEN), polybutylene terephthalate (PBT), polyimide (PI), polyetherimide (PEI), polyetherketone (PEK), polyether ether ketone (PEEK), nylon (NY), polyamide (PA), polycarbonate (PC), polystyrene (PS), expanded polystyrene (FS/EPS, also called foamed "polystyrene"), polyvinyl chloride (PVC), polyvinylidene chloride (PVDC), saponified ethylene vinyl alcohol (EVOH), polyvinyl alcohol (PVA), plain transparent (PT) cellophane, moisture-proof sealable transparent (MST) cellophane, polyacrylonitrile (PAN), vinylon (VL), polyurethane (PU), and triacetyl cellulose (TAC). For example, the first protective layer 591 may be formed of a metal foil (aluminum foil or copper foil), a vacuum metalized (VM) film, or the like, or may be configured of one of various types of paper, including translucent paper, washi (traditional Japanese paper), wood-free paper, dust-free paper, glassine paper, clay-coated paper, resin-coated paper, laminated paper (polyethylene-laminated paper, polypropylene-laminated paper, etc.), synthetic paper, kraft paper, and the like. The first protective layer 591 may also be formed of a nonwoven cloth or a glass cloth, for example.

The first protective layer 591 is provided to protect the heat-sensitive layer 592 from oil, dirt, and the like and to enhance resistance to various matter (resistance to plasticizers, water, oil, and chemicals). The first protective layer 591 is formed of a water-soluble resin (polyvinyl alcohol, etc.), a resin emulsion, and the like. The heat-sensitive layer 592 produces color at temperatures within a prescribed range. The heat-sensitive layer 592 includes leuco dye, developer, auxiliary agents (fillers, binders, lubricants, antioxidants, water-resistant additives, film-forming assistants, pigments, stabilizers, dispersants, antifoaming agents, etc.), and the like.

The second protective layer 593 is provided on the side of the heat-sensitive layer 592 opposite the first protective layer 591. The second protective layer 593 includes at least one resin from among fluorine-based resins, silicone-based resins, olefin-based resins, polyester-based resins, epoxy/polyester-based resins, and silicon-based resins. Resins included in the second protective layer 593 are preferably polyvinyl fluoride resins (fluorides), polyvinylidene fluoride resins (difluorides), polychlorotrifluoroethylene resins (trifluorides), and polytetrafluoroethylene resins (tetrafluorides), and most preferably polytetrafluoroethylene resins. The second protective layer 593 is formed of material that transfers heat to the heat-sensitive layer 592. As shown in FIG. 3, the second tape spool 41 about which the first tape 59 is wound is disposed so as to be rotatable via the support hole 66a (see FIG. 2) and the support hole 66b (see FIG. 4). The second protective layer 593 in the section of the first tape 59 positioned between the opening 34a and guide parts 36 confronts the thermal head 10 provided in the cassette housing section 8 of the printing device 1.

As shown in FIG. 3, the second tape 58 is wound in a roll about the first tape spool 40 and is accommodated in the interior space of the cassette case 31. As shown in FIG. 5, the second tape 58 is provided with a first adhesive layer 581, and a base material 582. The first adhesive layer 581 includes at least one adhesive from among an emulsion-type adhesive containing an acrylic polymer and a rubber-based adhesive and compounded with a tackifying resin, silicone based adhesive, and rubber-based adhesive. The first adhesive layer 581 is bonded to the second protective layer 593 of the first tape 59.

The base material 582 is bonded to the surface of the first adhesive layer 581 on the side opposite the surface bonded to the second protective layer 593. The base material 582 in this example is a release paper. The base material 582 may be configured of paper, film, or synthetic paper. In the preferred embodiment, the surface of the base material 582 on the first adhesive layer 581 side is subjected to a non-silicone-based release treatment, and the surface of the base material 582 on the opposite side from the first adhesive layer 581 is also subjected to a non-silicone-based release treatment. In other words, one surface of the base material 582 on the first adhesive layer 581 side is subjected to a non-silicone-based release treatment. Another surface opposite the surface of the base material 582 is subjected to non-silicone release treatment.

The non-silicone-based release agent used in this release treatment is a pendant-type polymer of a long-chain fatty acid produced by reacting an aliphatic isocyanate with polyvinyl alcohol, or the like. A non-silicone-based release agent can be used to form a release coating simply by applying a liquid composition formed by dissolving the release agent in solvent to a supporting medium and drying the liquid composition, for example, without needing to use a special catalyst or to perform heat treatment or other processes when forming the release coating. As shown in FIG. 3, the first tape spool 40 is disposed so as to be rotatable via the support hole 65a (see FIG. 2) and the support hole 65b (see FIG. 4). The second tape 58 is wound about the first tape spool 40 such that the base material 582 faces outward and is arranged and conveyed in a manner that brings the first adhesive layer 581 against the second protective layer 593 of the first tape 59. In other words, the second tape 58 is wound in a roll about the first tape spool 40 with the first adhesive layer 581 facing inward.

3. Overview of the Printing Process on the Printing Device 1

When the printing device 1 performs printing, the tape drive roller 46 driven to rotate via the tape drive shaft 100 pulls the first tape 59 from the second tape spool 41 in cooperation with the movable feed roller 14. The first tape 59 drawn off the second tape spool 41 is redirected leftward at the bottom-right corner of the cassette case 31 in a plan view (i.e. at the right-front corner of the cassette case 31) and conveyed along the conveying path in the arm part 34. The first tape 59 is supplied through the opening 34a of the arm part 34 into the opening 77 and is conveyed between the thermal head 10 and platen roller 15. The first tape 59 receives heat from the thermal head 10 on the second protective layer 593 side while between the opening 34a and the guide parts 36. This heat produces printed characters, graphics, symbols, and the like in the heat-sensitive layer 592. The tape drive roller 46 and movable feed roller 14 work in concert to convey the printed first tape 59 onto the prescribed conveying path while the first tape 59 is guided by the guide parts 36 so that the first adhesive layer 581 of the second tape 58 adheres to the second protective layer 593 of the first tape 59 (see FIG. 5(A)). The first tape 59 having the second tape 58 affixed thereto becomes the printing tape 50. This printing tape 50 is conveyed toward the tape discharge part 49 and cut by the cutting mechanism 17.

Figure 5A:
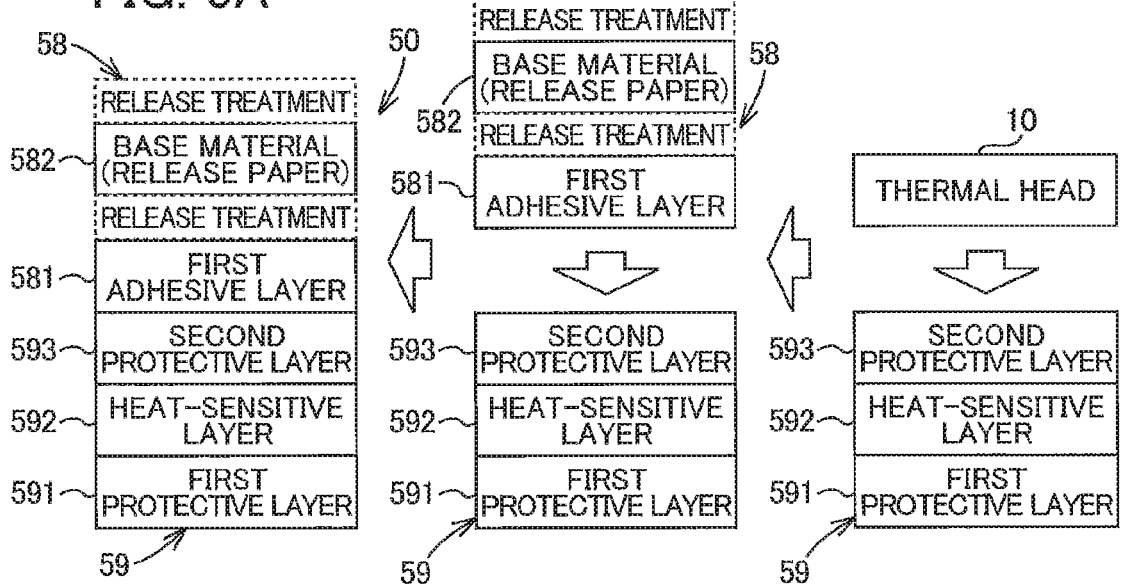
FIG. 5A is an explanatory drawing of a positioning of a thermal head relative to a first tape and production process of the printing tape by affixing the first tape and a second tape to each other.
Figure 5B:
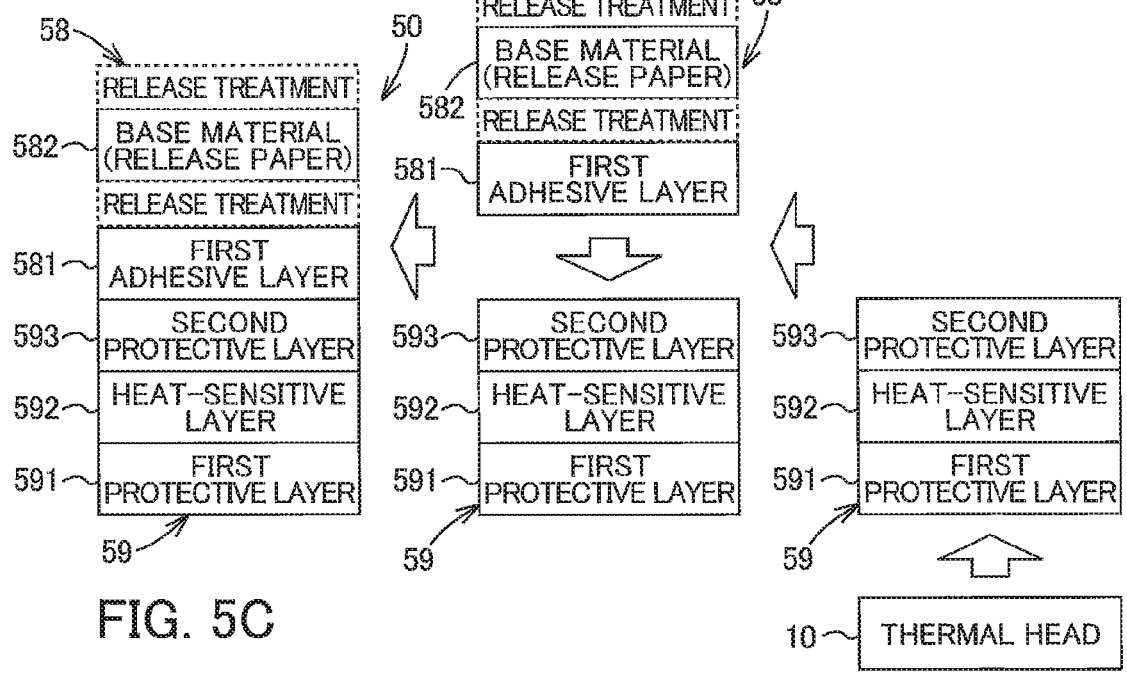
FIG. 5B is an explanatory drawing of a positioning of the thermal head relative to the first tape and production process of the printing tape affixing the first tape and the second tape to each other according to a first variation.
Figure 5C:
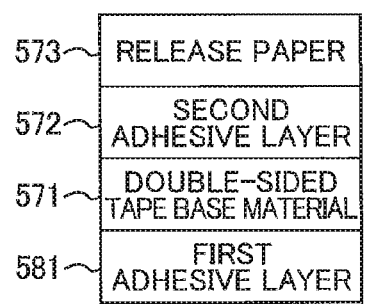
FIG. 5C is an explanatory drawing of a second tape according to a second variation.

4. First Variation of the Printing Tape Cassette 30 According to the First Embodiment In the printing tape cassette 30 according to the first embodiment, the first tape 59 may be arranged such that the first protective layer 591 opposes the thermal head 10 provided in the cassette housing section 8 of the printing device 1 while passing between the opening 34a and the guide parts 36, as illustrated in FIG. 5(B). In this case, the first protective layer 591 is preferably formed of a material that conveys heat to the heat-sensitive layer 592.

5. Second Variation of the Printing Tape Cassette 30 and the Printing Tape 50 According to the First Embodiment The second tape used to form the printing tape 50 may be configured to include a double-sided tape base material 571, as in a second tape 258 illustrated in FIG. 5(C). In this case, the second tape 258 may include a second adhesive layer 572 affixed to the side of the double-sided tape base material 571 opposite the first adhesive layer 581, and a release paper 573 affixed to the second adhesive layer 572.

In the first embodiment and the first variation, the cassette case 31, top surface 30a, bottom surface 30b, and side surface 30c are respective examples of the cassette case, first surface, second surface, and third surface in the present invention. The first tape 59, heat-sensitive layer 592, first protective layer 591, and second protective layer 593 are respective examples of the first tape, heat-sensitive layer, first protective layer, and second protective layer in the invention. The second tape 58, first adhesive layer 581, and base material 582 are respective examples of the second tape, the first adhesive layer, and the base material in the invention. In the second variation, the double-sided tape base material 571 is an example of the base material in the invention.

6. Tests for Evaluation

The printing characteristics of the printing tape 50 according to the first embodiment were evaluated by testing a tape whose second protective layer includes polyvinyl alcohol as a comparative example, and a tape whose second protective layer includes fluorine-based resin as an example of the preferred embodiment. The same heat-sensitive layer, first adhesive layer, and second adhesive layer were used in both the comparative example and the example of the embodiment. Specifically, as indicated in FIG. 10, the heat-sensitive layer used in the experiments was a common heat-sensitive layer that included leuco dye, developer, auxiliary agents (fillers, binders, lubricants, antioxidants, water-resistant additives, film-forming assistants, pigments, stabilizers, dispersants, antifoaming agents, etc.), and the like. The first protective layer was formed of PET at a thickness of 25 μm. The first adhesive layer was formed with an acrylic-based adhesive (solvent). The second protective layer in the comparative example was formed of polyvinyl alcohol at a thickness of approximately 1 μm. The second protective layer in the example of the embodiment was formed of polytetrafluoroethylene resin (tetrafluoride) at a thickness of approximately 1 μm. The width of the printing tape (vertical dimension in FIG. 10) was 12 mm, and the characters ABC were printed in 22-point Gothic type using the same printing device for both tests. Printing tape according to both the comparative example and the example of the embodiment were printed in black characters and left for seven days under the high-temperature and high-humidity conditions of 50° C. and 90% humidity, after which the printing characteristics were evaluated. A Macbeth densitometer (with black filter) was used to evaluate the printing characteristics by measuring optical density (OD values).

As shown in FIG. 10, the black color forming the characters on the printed tape according to the comparative example disappeared after being exposed for seven days to high temperature and high humidity. On the other hand, the black characters remained vibrant in the printed tape according to the example of the embodiment after seven days under high-temperature and high-humidity conditions, with an OD value of 1.2. Thus, a marked difference in resistance to temperature and water (humidity) was observed in the printing tape according to the preferred embodiment and the printing tape according to the comparative example.

Even though the first adhesive layer 581 of the second tape 58 is affixed to the second protective layer 593 of the first tape 59 after the printing process, the second protective layer 593 in the printing tape cassette 30 according to the first embodiment protects the heat-sensitive layer 592 from the first adhesive layer 581. As confirmed in the evaluation results, the resin used to form the second protective layer 593 in the preferred embodiment can better protect the heat-sensitive layer 592 from the effects of temperature, humidity, and the like than the resin emulsion and water-soluble resins, such as polyvinyl alcohol, used in the overcoat layer of the conventional printing tape. Further, since the resin used to form the second protective layer 593 has relatively low polarity, the first adhesive layer 581 can be made to adhere well to the second protective layer 593 by forming the first adhesive layer 581 of an adhesive exhibiting good adhesive properties with nonpolar adherends.

The printing tape cassette 30 is provided with release paper as the first adhesive layer 581. Thus, the printing tape can be affixed to a desired object after peeling off the base material 582 (release paper).

The surface of the base material 582 on the first adhesive layer 581 side is treated with a non-silicone-type release agent. Thus, the printing tape cassette 30 can decrease blocking between the adhesive in the first adhesive layer 581 and the base material 582 and reduce the release force. The surface of the base material 582 on the side opposite the first adhesive layer 581 side is also subjected to treatment with a non-silicone-release agent. Thus, the printing tape cassette 30 can decrease blocking between the adhesive and the base material 582 and can reduce the release force, even when the first adhesive layer 581 is affixed to the surface of the base material 582 on the opposite side of the first adhesive layer 581.

The second tape 258 according to the second variation includes the double-sided tape base material 571 as the base material affixed to the first adhesive layer 581. The printing tape cassette 30 in this variation also includes the second adhesive layer 572 affixed to the side of the double-sided tape base material 571 opposite the first adhesive layer 581, and the release paper 573 affixed to the second adhesive layer 572. With the printing tape cassette 30 according to the second variation, the thickness, strength, and the like of the printing tape configured by affixing the second tape 258 to the first tape 59 can be adjusted according to the double-sided tape base material 571. The printing tape of the printing tape cassette 30 can be affixed to a desired object after peeling off the release paper 573.

In the first embodiment, the printing tape cassette 30 is mounted in the cassette housing section 8 of the printing device 1, which includes the thermal head 10, and the second protective layer 593 of the section of the first tape 59 positioned between the opening 34a and the guide parts 36 confronts the thermal head 10. Accordingly, the printing tape cassette 30 can facilitate the transfer of heat from the thermal head 10 to the heat-sensitive layer 592 to produce color in the heat-sensitive layer 592 properly. Further, since second protective layer 593 is formed of a material that transfers heat to the heat-sensitive layer 592, the printing tape cassette 30 can transfer heat from the thermal head 10 to the heat-sensitive layer 592 to produce color in the heat-sensitive layer 592.

When the printing tape cassette 30 according to the first variation is mounted in the cassette housing section 8 of the printing device 1, the first protective layer 591 of the first tape 59 confronts the thermal head 10. Accordingly, the printing tape cassette 30 can easily transfer heat from the thermal head 10 to the heat-sensitive layer 592 to produce color in the heat-sensitive layer 592 properly. Further, since first protective layer 591 of the printing tape cassette 30 is formed of a material that transfers heat to the heat-sensitive layer 592, the printing tape cassette 30 can transfer heat from the thermal head 10 to the heat-sensitive layer 592 to produce color in the heat-sensitive layer 592.

Next, a printing tape cassette 109 according to a second embodiment of the present invention and a printing device 4 in which the printing tape cassette 109 is mounted will be described with reference to FIGS. 6 through 9. In the following description, the lower side, upper side, left side, and right side in FIG. 6 are respectively defined as the front side, rear side, left side, and right side of the printing device 4 and the printing tape cassette 109.

7. Structure of the Printing Device 4 According to a Second Embodiment

Figure 6:
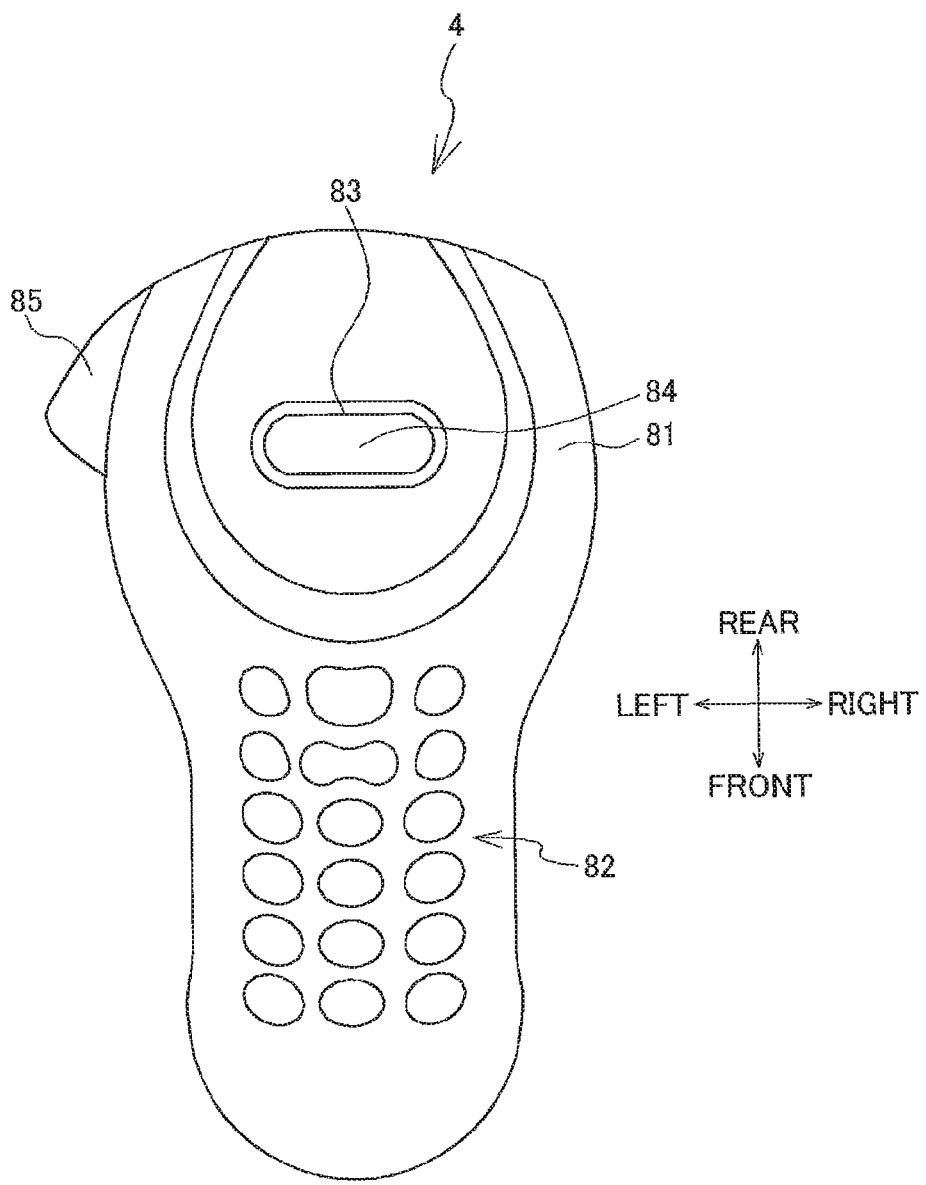
FIG. 6 is a plan view of a printing device according to a second embodiment; embodiment.

As shown in FIG. 6, the printing device 4 is provided with a main unit 81, a cover (not shown), an operating section 82, a window section 83, a display unit 84, and a cutter lever 85. The main unit 81 is a case formed of a synthetic resin in a general elliptical shape that is elongated vertically. The cover is detachably mounted on the bottom of the main unit 81 so as to cover the entire bottom surface (the surface on the opposite side of the surface that the user faces when operating the printing device 4). The operating section 82 includes character keys for alphabetic and numeric characters and symbols, and various function keys. The window section 83 is a region elongated in the left-right direction and inset in the top surface of the main unit 81 at the approximate center thereof. The display unit 84 is disposed in the bottom of the window section 83. The display unit 84 can display inputted alphanumeric characters and symbols. The cutter lever 85 is provided in the side surface of the main unit 81 on the left side of the display unit 84. When the user pushes the cutter lever 85 inward (rightward), a cutting blade 90 described later can cut printing tape discharged through a tape discharge opening (not shown) formed in the rear surface of the main unit 81.

Figure 7:
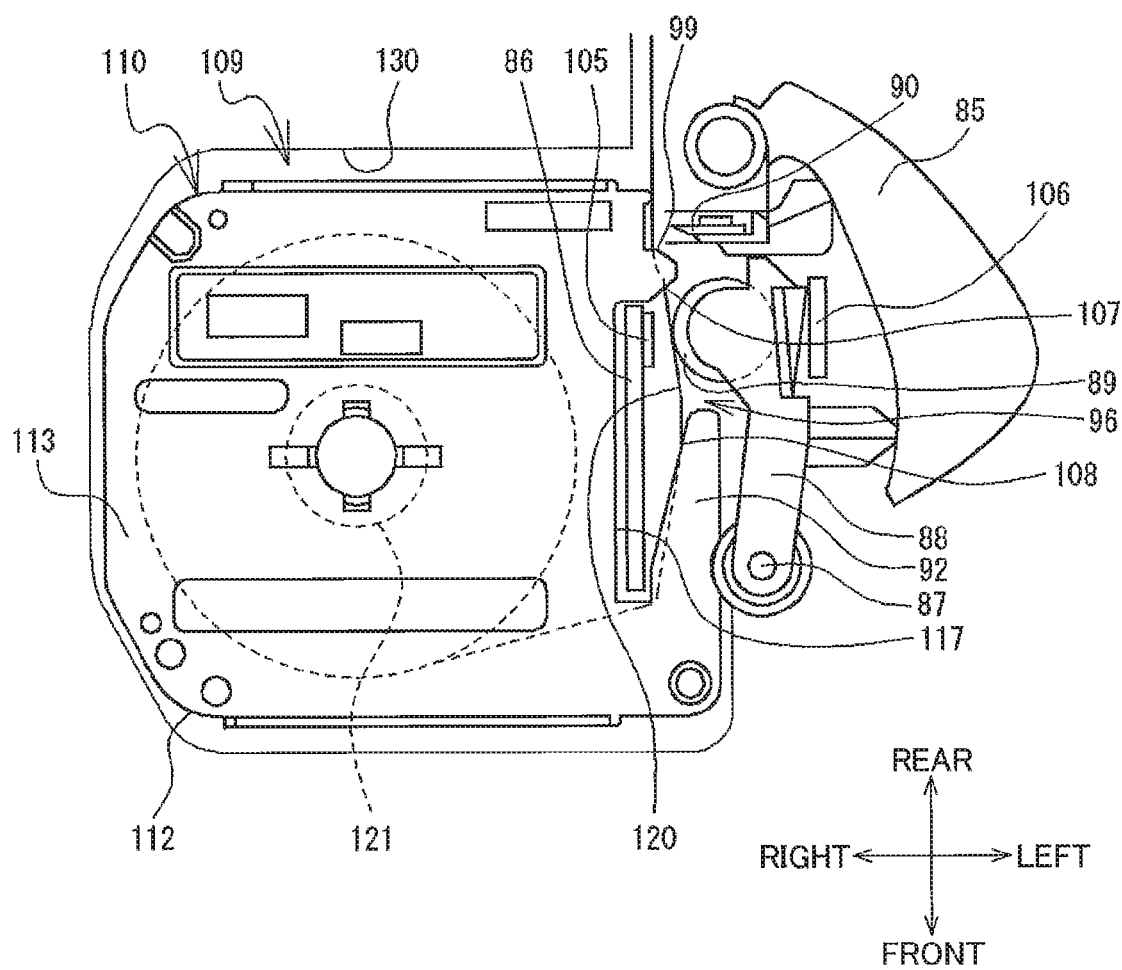
FIG. 7 is a rear view of a cassette housing section when the printing tape cassette 109 is attached to the cassette housing section.

Next, the internal structure of the main unit 81 in the region covered by the cover will be described. As shown in FIG. 7, a cassette housing section 130 is provided inside the main unit 81 in a region corresponding to the cover. When the cover is removed, the printing tape cassette 109 can be freely inserted into and removed from the cassette housing section 130. The cassette housing section 130 is formed as a depression that substantially corresponds to the shape of a top surface 111 of a cassette case 110 described later when the printing tape cassette 109 is mounted in the cassette housing section 130.

The cassette housing section 130 is also provided with a conveying mechanism that conveys printing tape 120 drawn out from the printing tape cassette 109, a printing mechanism that prints characters and the like on the surface of the tape, and the like. A head holder 86 is fixedly disposed on the left side of the cassette housing section 130. A thermal head 105 provided with heating elements (not shown) is mounted in the head holder 86.

As shown in FIG. 7, an arm-like platen holder 88 is pivotably supported about a support shaft 87 provided on the left side of the head holder 86. A platen roller 89 is rotatably supported on the distal end (rear end) of the platen holder 88. The platen roller 89 is disposed so as to be capable of contacting and separating from the thermal head 105 when the platen holder 88 pivots. When the cover (not shown) has been removed, a torsion spring (not shown) urges the platen holder 88 in an outward direction (clockwise in the bottom view of FIG. 7) toward a standby position (not shown). In the standby position, the platen holder 88 is in contact with a position fixing part 106. When the cover is assembled on the rear surface section of the main unit 81, a protruding part on the inside of the cover is wedged between the side surface of the platen holder 88 and the position fixing part 106, rotating the platen holder 88 toward the thermal head 105 against the urging force of the torsion spring. At this time, the platen holder 88 is fixed in the operating position shown in FIG. 7 through contact with the inner surface of the protruding part. When the platen holder 88 has been rotated toward the printing tape cassette 109 and fixed in the operating position, the platen roller 89 presses a section of the printing tape 120 in the printing tape cassette 109 against the thermal head 105. By rotating the platen roller 89 while the platen holder 88 is in the operating position, the platen roller 89 can convey the printing tape 120 from the printing tape cassette 109 and discharge the printing tape 120 from the main unit 81. A cutting blade 90 is disposed in the left-rear corner of the cassette housing section 130 downstream of the platen roller 89 in the tape-conveying direction. The cutting blade 90 cuts the printing tape 120 at a prescribed position when the user presses the cutter lever 85.

8. Structure of the Printing Tape Cassette 109 According to the Second Embodiment Next, the structure of the printing tape cassette 109 according to the second embodiment will be described with reference to FIGS. 7 through 9. As shown in FIGS. 7 and 8, the printing tape cassette 109 is provided with a cassette case 110, and the printing tape 120. Overall, the cassette case 110 is a substantially rectangular parallelepiped (box-shaped) housing with corners that are rounded in a plan view. The cassette case 110 is a box-like casing that includes a top surface 111 and a bottom surface 113 constituting a pair of rectangular-shaped planar surfaces oppositely arranged in the front-rear direction, and a side surface 112 formed at a prescribed width along the outer edges of the top surface 111 and bottom surface 113 (in this example, four side surfaces including the top surface, bottom surface, left side surface, and right side surface). The combination of the top surface 111, the bottom surface 113, and the side surface 112 defines an internal space. The printing tape 120 is accommodated in the internal space and wound in a roll. In the cassette case 110, the side surface 112 need not enclose the entire peripheries of the top surface 111 and bottom surface 113. For example, an opening may be provided in a portion of the side surface 112 (the rear surface, for example) that exposes the interior of the cassette case 110, and a boss connecting the top surface 111 to the bottom surface 113 may be provided in a position confronting this opening. In the second embodiment, the front-rear dimension of the cassette case 110 (i.e., the direction in which the top surface 111 and bottom surface 113 oppose each other) substantially corresponds to the direction in which the printing tape cassette 109 is inserted into and removed from the cassette housing section 130.

The side surface 112 is provided with an arm part 92, an opening 108, a guide part 107, and a tape discharge part 99. The arm part 92 extends diagonally leftward and rearward from the left-front portion of the printing tape cassette 109. The opening 108 is formed in the distal end (rear end) of the arm part 92 extending vertically. A conveying path for guiding conveyance of the printing tape 120 is formed in the arm part 92. After the printing tape 120 is guided along this conveying path, the printing tape 120 is discharged through the opening 108 into a head insertion section 117 (and more specifically, an opening 96). Thus, the opening 108 is provided in the side surface 112 and constitutes the portion in the cassette case 110 through which the printing tape 120 guided along the prescribed conveying path passes from the inside to the outside of the cassette case 110.

The guide part 107 is provided on the upstream side of the opening 108 formed in the side surface 112 on the left side of the printing tape cassette 109. The guide part 107 is an opening that guides the printing tape 120 discharged out through the opening 108 toward the tape discharge part 99. The printing tape 120 passes from the outside to the inside of the cassette case 110 through the guide part 107. The tape discharge part 99 is an opening formed in the left-rear corner of the cassette case 110. The tape discharge part 99 extends vertically. After the printing tape 120 has passed from the outside to the inside of the cassette case 110 through the guide part 107, the printing tape 120 can pass from the inside to the outside of the cassette case 110 through the tape discharge part 99.

The head insertion section 117 is a rectangular space formed between the opening 108 and guide part 107. The head insertion section 117 is elongated vertically in a left side view and penetrates the printing tape cassette 109 in the vertical direction. The head insertion section 117 is provided in a leftwardly biased position in the cassette case 110 (i.e., a position biased toward the side opposite the center of the roll formed by the printing tape 120). The head holder 86 that supports the thermal head 105 of the printing device 4 is inserted into the head insertion section 117. After the printing tape 120 has passed from the inside to the outside of the cassette case 110 through the opening 108, the thermal head 105 prints on the printing tape 120 in a position between the opening 108 and guide part 107 where the printing tape 120 is exposed to the outside of the cassette case 110.

Figure 9A:
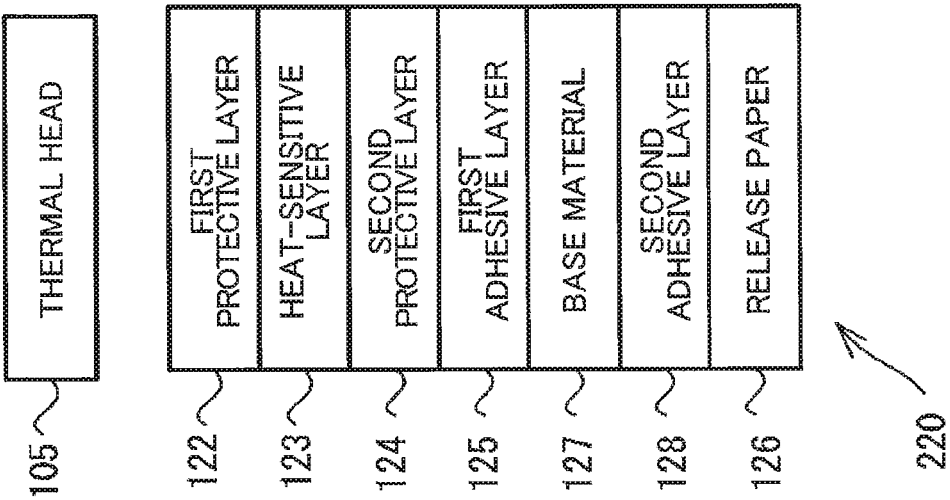
FIG. 9A is an explanatory drawing of a thermal head relative to a printing tape.

The printing tape 120 is wound about a tape spool 121 provided in the printing tape cassette 109 to form a tape roll that is accommodated in the cassette case 110. As shown in FIG. 9(A), the printing tape 120 is configured of a first protective layer 122, a heat-sensitive layer 123, a second protective layer 124, a first adhesive layer 125, and a release paper 126, as described in the first embodiment. The first protective layer 122 is provided on the heat-sensitive layer 123. The first protective layer 122 transmits light. The first protective layer 122 is formed of a material that transfers heat to the heat-sensitive layer 123. The heat-sensitive layer 123 produces color at temperatures within a prescribed range. The second protective layer 124 is provided on the side of the heat-sensitive layer 123 opposite the first protective layer 122. The second protective layer 124 includes at least one resin from among fluorine-based resins, silicone-based resins, olefin-based resins, polyester-based resins, epoxy/polyester-based resins, and silicon-based resins. The first adhesive layer 581 includes at least one adhesive from among an emulsion-type adhesive containing an acrylic polymer and a rubber-based adhesive and compounded with a tackifying resin, silicon-based adhesive, and rubber-based adhesive. The first adhesive layer 125 is bonded to the side of the second protective layer 124 opposite the heat-sensitive layer 123. The release paper 126 is bonded to the surface of the first adhesive layer 125 on the side opposite the surface bonded to the second protective layer 124. In the preferred embodiment, the surface of the release paper 126 on the first adhesive layer 125 side is subjected to the same non-silicone-based release treatment described in the first embodiment. In other words, a surface of the release paper 126 on the first adhesive layer 125 side is subjected to a non-silicone-based release treatment.

Figure 9B:
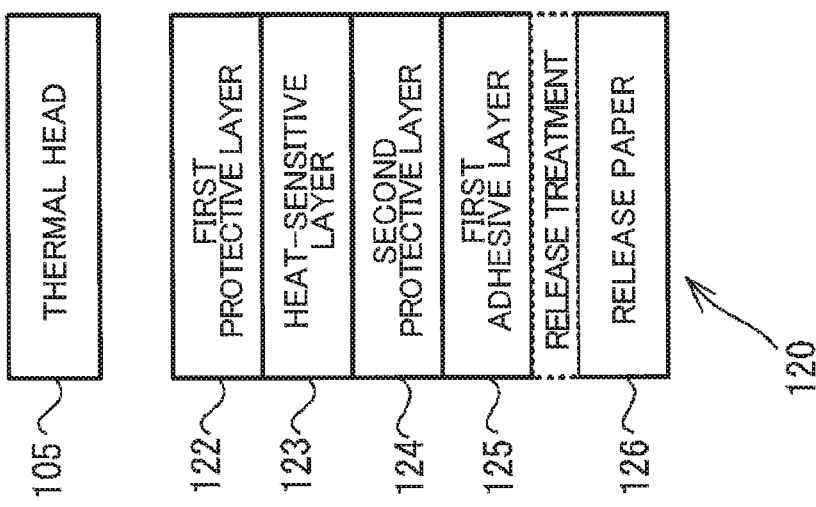
FIG. 9B is an explanatory drawing of the thermal head relative to a printing tape according to a third variation.

9. Third Variation of the Printing Tape Cassette 109 and Printing Tape 120 According to the Second Embodiment FIG. 9(B) shows a printing tape 220 according to a third variation of the printing tape 120 in the printing tape cassette 109 of the second embodiment. As shown in FIG. 9(B), the printing tape 220 may be provided with a base material 127 and a second adhesive layer 128 between the first adhesive layer 125 and release paper 126. The base material 127 is affixed to the surface of the first adhesive layer 125 on the opposite side of the second protective layer 124. The second adhesive layer 128 is affixed to the surface of the base material 127 on the side opposite the first adhesive layer 125. The release paper 126 is affixed to the surface of the second adhesive layer 128 on the side opposite the base material 127.

In the second embodiment and the third variation, the printing tape 120, heat-sensitive layer 123, first protective layer 122, second protective layer 124, first adhesive layer 125, and release paper 126 are respective examples of the printing tape, the heat-sensitive layer, the first protective layer, the second protective layer, the first adhesive layer, and the release paper in the present invention. In the third variation, the base material 127, release paper 126, and second adhesive layer 128 are respective examples of the base material, the release paper, and the second adhesive layer in the invention. The cassette case 110, top surface 111, bottom surface 113, and side surface 112 are respective examples of the cassette case, the first surface, the second surface, and the third surface in the invention.

In the printing tape 120 according to the second embodiment, the second protective layer 124 protects the heat-sensitive layer 123 from the first adhesive layer 125. The resin used to form the second protective layer 124 can better protect the heat-sensitive layer 123 from the effects of temperature, humidity, and the like than the resin emulsion and water-soluble resins, such as polyvinyl alcohol, used in the overcoat layer of the conventional printing tape. Further, since the resin used to form the second protective layer 124 has relatively low polarity, the first adhesive layer 125 can be made to adhere well to the second protective layer 124 by forming the first adhesive layer 125 of an adhesive exhibiting good adhesive properties with nonpolar adherends.

The printing tape 120 is provided with the release paper 126 on the side of the first adhesive layer 125 opposite the second protective layer 124. Thus, the printing tape 120 can be affixed to a desired object after peeling off the release paper 126.

With the printing tape 120, the surface of the release paper 126 on the first adhesive layer 125 side is treated with a non-silicone-type release agent. Thus, the printing tape 120 can decrease blocking between the adhesive in the first adhesive layer 125 and the release paper 126 and reduce the release force.

The printing tape 220 according to the third variation is provided with the base material 127 on the side of the first adhesive layer 125 opposite the second protective layer 124, the release paper 126, and the second adhesive layer 128 disposed between the base material 127 and release paper 126. With the printing tape 220 having this configuration, the thickness, strength, and the like of the printing tape 220 can be adjusted according to the base material 127. The printing tape 220 can be affixed to a desired object after peeling off the release paper 126.

When the printing tape cassette 109 is mounted in the cassette housing section 130 of the printing device 4, which includes the thermal head 105, the first protective layer 122 of the printing tape 120 confronts the thermal head 105 between the opening 108 and guide part 107. Accordingly, the printing tape cassette 109 can better facilitate the transfer of heat from the thermal head 105 to the heat-sensitive layer 123 than when the side of the printing tape 120 opposite the first protective layer 122 confronts the thermal head 105, thereby suitably producing color in the heat-sensitive layer 123.

The first protective layer 122 is formed of a material that transfers heat to the heat-sensitive layer 123. Accordingly, the printing tape cassette 109 can transfer heat from the thermal head 105 to the heat-sensitive layer 123 to produce color in the heat-sensitive layer 123.

Printing tape and printing tape cassette in the present invention are not limited to the embodiments as described above. The present invention may be worked by making various changes within the spirit and scope of the invention. For example, following changes may be added appropriately.

The structure of the printing device in which the printing tape cassette is mountable may be modified as needed. Further, the size, shape, material, and the like of the cassette case constituting the printing tape cassette may be modified as needed. The printing tape 120 need not be accommodated in the printing tape cassette 109. The printing tapes 120 and 50 need not be provided with release paper. When the printing tape 50 is provided with release paper, it is sufficient to treat just one surface of the release paper with a non-silicone-type release agent and unnecessary to treat both surfaces of the release paper. When the printing tape 120 is provided with release paper, the release paper need not be treated with a release agent. The printing tapes 50 and 120 need not be wound into rolls. The conveying path for conveying printing tape within the cassette case may be modified as needed. The printing tape cassette may be provided with the platen roller. The arrangement of the thermal head relative to the printing tape cassette and the printing tape (first tape) when the printing tape cassette is mounted in the printing device may be modified as needed.

What is claimed is:

1. A printing tape cassette comprising:
   a cassette case having a first surface, a second surface facing the first surface, and a third surface connecting the first surface to the second surface, a combination of the first surface, the second surface, and the third surface defining an internal space, the cassette case being attached to a cassette housing section of a printing device;
   a first tape accommodated in the internal space and wound in a roll, the first tape comprising:
   a heat-sensitive layer producing color at temperatures within a prescribed range;
   a first protective layer provided on the heat-sensitive layer, light being allowed to transmit through the first protective layer; and
   a second protective layer provided on a side of the heat-sensitive layer opposite the first protective layer, the second protective layer containing epoxy polyester-based resin; and
   a second tape accommodated in the internal space and wound in a roll, the second tape comprising:

a first adhesive layer containing acrylic polymer and rubber-based adhesive, the first adhesive layer having one surface and another surface opposite to the one surface; and a base material adhered to the one surface of the first adhesive layer, wherein the first tape fed from the roll of the first tape and printed by the printing device is joined to the second tape fed from the roll of the second tape such that the another surface of the first adhesive layer in the second tape is adhered to the second protective layer of the printed first tape to allow the second protective layer of the printed first tape to be disposed between the first adhesive layer and the heat-sensitive layer.

2. The printing tape cassette according to claim 1, wherein the base material is a release paper.

3. The printing tape cassette according to claim 2, wherein the release paper has one surface facing the first adhesive layer, the one surface of the release paper being subjected to non-silicone-based release treatment.

4. The printing tape cassette according to claim 2, wherein the release paper has one surface facing the first adhesive layer and another surface opposite the one surface, the another surface of the release paper being subjected to non-silicone-based release treatment.

5. The printing tape cassette according to claim 1, wherein the base material is a double-sided tape base material adhered to the first adhesive layer, the second tape further comprising:
a second adhesive layer adhered to the double-sided tape base material opposite the first adhesive layer; and
a release paper adhered to the second adhesive layer.

6. The printing tape cassette according to claim 1,
wherein an opening portion is provided in the third surface, the first tape running through a predetermined passage is passed from an interior of the cassette case to an exterior thereof at the opening portion, a guide portion is provided in the third surface to guide the first tape conveyed to the opening portion, and the first protective layer of a part of the first tape positioned between the opening portion and the guide portion is configured to face a thermal head positioned at the cassette housing section of the printing device.

7. The printing tape cassette according to claim 6,
wherein the first protective layer is formed of a heat transfer material capable of transferring heat to the heat-sensitive layer.

8. The printing tape cassette according to claim 1, wherein an opening portion is provided in the third surface, the first tape running through a predetermined passage is passed from an interior of the cassette case to an exterior thereof at the opening portion, a guide portion is provided in the third surface to guide the first tape conveyed to the opening portion, and the second protective layer of a part of the first tape positioned between the opening portion and the guide portion is configured to face a thermal head positioned at the cassette housing section of the printing device.

9. The printing tape cassette according to claim 8, wherein the second protective layer is formed of a heat transfer material capable of transferring heat to the heat-sensitive layer.

10. The printing tape cassette according to claim 1, wherein the first adhesive layer is made by using emulsion-type adhesive compounded with tackifying resin and containing the acrylic polymer and the rubber-based adhesive.

11. A method of producing a printing tape cassette, the method comprising:

preparing a cassette case having a first surface, a second surface facing the first surface, and a third surface connecting the first surface to the second surface, a combination of the first surface, the second surface, and the third surface defining an internal space, the cassette case being used for being attached to a cassette housing section of a printing device;

preparing a first tape, the first tape comprising a heat-sensitive layer, a first protective layer, and a second protective layer, the first protective layer being provided on the heat-sensitive layer and the second protective layer being provided on a side of the heat-sensitive layer opposite the first protective layer, the heat-sensitive layer being used for producing color at temperatures within a prescribed range, the first protective layer allowing light to pass therethrough, the second protective layer containing epoxy polyester-based resin;

preparing a second tape comprising a first adhesive layer and a base material, the first adhesive layer being made by using emulsion-type adhesive compounded with tackifying resin and containing acrylic polymer and rubber-based adhesive, the first adhesive layer having one surface and another surface opposite to the one surface, the base material being adhered to the one surface of the first adhesive layer; and combining both of the first tape and the second tape with the cassette case such that both of the first tape and the second tape are accommodated in the internal space, the first tape being wound in a roll and the second tape being wound in a roll in such a manner that, when the first tape is fed from the roll of the first tape and printed by the printing device and the second tape is fed from the roll of the second tape, the first tape is joined to the second tape such that the another surface of the first adhesive layer in the second tape is adhered to the second protective layer of the printed first tape to allow the second protective layer of the printed first tape to be disposed between the first adhesive layer and the heat-sensitive layer.

* * * * *